United States Patent Office 2,698,808
Patented Jan. 4, 1955

2,698,808

LIQUID FLY LINE DRESSING

Frederick R. Elias, North Canton, Ohio

No Drawing. Application April 13, 1950,
Serial No. 155,797

3 Claims. (Cl. 106—271)

The invention relates to a solution for increasing the buoyancy and water repellency of fishing lines and lures, more particularly those used in fly casting, and this invention constitutes improvements over the invention disclosed in my U. S. Patent No. 2,309,052, issued January 19, 1943, and entitled Fish Line Floating Solution. Said prior patent discloses a solution in which a fly line may be dipped for dressing the line to make it more buoyant, so that one application of the solution will cause the line to float during casting in natural waters.

A liquid fly line dressing has a number of advantages over the ordinary wax or paste type of dressing, because the latter takes longer to apply, does not impregnate the line as thoroughly or as uniformly, wears off quickly, and is stickier so that it picks up more dirt and scum from the water.

While the fly line solution disclosed in said Patent No. 2,309,052 accomplishes all of these advantages and was widely used with satisfactory results by fly line fishermen, it was found to have a certain disadvantage when used over substantial periods of time. This disadvantage was that the solution attacked the oil or enamel finish on certain lines, in some cases causing it to soften and flake or chip off, and in other cases causing it to become sticky or tacky. The flaking or chipping off of the finish obviously permitted the water to get underneath the finish of the line and decrease its buoyancy and useful life. The stickiness imparted to certain finishes by my prior fly line solution resulted in the line picking up scum and dirt from the natural waters in which it was used.

After making a series of careful tests, I determined that these deleterious results were due to the action of the animal fat contained in the cup grease forming part of the composition of the solution disclosed in my Patent No. 2,309,052. This action is probably due to the fact that the animal fat becomes rancid after being applied to the line, if not before.

As a result of further tests and experiments, I have finally discovered and developed an entirely new and different formula or composition for a liquid fly line dressing or floating solution, which does not have any damaging effect on the finish of any known make or type of fly line, regardless of how long it may be applied thereto.

Accordingly, it is an object of the present invention to provide a liquid fly line dressing which is easy to apply to a substantial length of fly line for cleaning and impregnating the line and rendering it water repellent, without affecting the exterior finish of the line in any way.

Another object is to provide an improved solution for rendering both fly lines and flies used therewith water resistant and buoyant over long periods of use in natural waters without attacking the finish of the line.

A further object is to provide an improved water repellent solution which can be applied to wet or dry flies and fly line leaders for floating the same, if desired.

A still further object is to provide a novel and improved solution for making a fly line water repellent, which solution does not contain any kind of animal fat or other ingredient which attacks the finish of fly lines.

These and other objects are accomplished by the novel ingredients and compositions comprising the present invention, which is hereinafter described in detail, and the scope of which is defined in the appended claims forming part hereof.

I have discovered that a solution consisting of certain proportions of ceresin wax and pure white petroleum jelly dissolved in carbontetrachloride accomplishes all of the foregoing advantages without having any deleterious effect on the finish of any known make or type of fly line, and that the buoyancy and water repellency of a fly line treated with this novel and improved solution is fully as high as that of a line treated with the solution of my prior patent, plus the fact that the line retains those characteristics over much longer periods of use because the solution or dressing does not attack the finish of the line but merely forms a protective, water-repellent coating thereover.

The preferred approximate proportions of the wax, petroleum jelly and carbontetrachloride are as follows:

Ceresin wax _____ pounds__ 6
Pure white petroleum jelly_____ do____ 20
Carbontetrachloride _____ gallons__ 16

While the above approximate proportions of these three ingredients produce a satisfactory liquid fly line dressing which accomplishes the objects of the present invention without attacking the finish of fly lines, I have further discovered that the addition of a small amount of a liquid methyl silicone increases the water repellency. This ingredient is a polydimethyl siloxane and is obtainable on the market as DC 200 Fluid, as produced by Dow Corning Corporation, of Midland, Michigan. I prefer to use about 28 ounces of DC 200 Fuid with the above proportions of the other three ingredients. I prefer to use DC 200 Fluid having a viscosity of 350 centistokes at 25° C., although the viscosity may vary considerably without affecting the desired result. This liquid methyl silicone is completely non-volatile at ordinary temperatures.

I have also discovered that the addition of a small amount of graphite in my improved solution gives the fly line a slicker finish and further increases its water repellency. The addition of the graphite appears to increase the water repellency by allowing the use of a slightly greater proportion of the petroleum jelly. I prefer to add approximately 12 ounces of a 5% solution of graphite dispersed in lubricating oil to the other four ingredients in the proportions previously given. By adding the liquid methyl silicone and graphite solution, or either of them, I am able slightly to increase the proportions of ceresin wax and petroleum jelly, without any resulting stickiness when a line is dressed with the solution. Accordingly, the preferred composition, including the five ingredients, is as follows:

Ceresin wax _____ pounds__ 8
Pure white petroleum jelly_____ do____ 24
Carbontetrachloride _____ gallons__ 16
DC 200 Fluid (silicone)_____ ounces__ 28
Graphite (5% solution)_____ do____ 12

In preparing the improved liquid fly line dressing, I prefer to first mix the ceresin wax and the petroleum jelly with about 2 gallons of the carbontetrachloride and heat this mixture to about 150°–160° F. until the wax is completely melted. I then pour this solution into the remaining 14 gallons of carbontetrachloride and thoroughly agitate to mix the same. The DC 200 Fluid and graphite solution may be added to the 14 gallons of carbontetrachloride before agitating, at the time the solution of ceresin wax and petroleum jelly in the 2 gallons of carbontetrachloride is added.

The improved liquid fly line dressing prepared in this manner is easily applied to a fly line or a fly lure merely by dipping the same in the liquid dressing, thereby eliminating the tedious task of applying a wax or paste to a long length of line.

I have found in actual practice that the improved liquid solution of this application cleans all dirt and scum from the line in the same manner as the solution of my prior patent, and thoroughly and uniformly impregnates the line so as to instantly float the same on the surface of the water. The improved solution dries immediately, so that the line can be dipped and is ready for instant use. Each dipping of the line removes all prior film as well as dirt and scum, so that a new clean film is left on the finish of the line.

I have found that the line after dipping is slick without being sticky or tacky, and thus stays clean for long periods of use while remaining water repellent without requiring repeated applications of the dressing.

The improved liquid fly line dressing is equally well adapted for application to fly lines, fly line leaders, and flies.

Having now described the invention, the compositions, preparation and use of the same, and the new and useful results obtained thereby, the novel compositions are set forth and defined in the appended claims.

I claim:

1. A liquid fly line dressing consisting essentially of about 8 pounds of ceresin wax, about 24 pounds of pure white petroleum jelly, and about 12 ounces of a 5% solution of graphite dispersed in lubricating oil, all dissolved and thoroughly mixed in about 16 gallons of carbontetrachloride the mixture being liquid at normal temperatures the fly line dressing being characterized by its ability to instantly form a dry film upon a fly line.

2. A liquid fly line dressing consisting of about 8 pounds of ceresin wax, about 24 pounds of pure white petroleum jelly, about 28 ounces of polydimethyl siloxanes having a viscosity of 350 centistokes at 25° C. and about 12 ounces of a 5% solution of graphite dispersed in lubricating oil, all dissolved and thoroughly mixed in about 16 gallons of carbon tetrachloride, the mixture being liquid at normal temperatures the fly line dressing being characterized by its ability to instantly form a dry film upon a fly line.

3. A liquid fly line dressing consisting essentially of about 6 to 8 pounds ceresin wax and about 20 to 24 pounds pure white petroleum jelly and about 28 ounces of polydimethyl siloxanes having a viscosity of 350 centistokes at 25° C. dissolved and thoroughly mixed in about 16 gallons of carbon tetrachloride to maintain the mixture liquid at normal temperatures the fly line dressing being characterized by its ability to instantly form a dry film upon a fly line.

References Cited in the file of this patent

UNITED STATES PATENTS

| | | |
|---|---|---|
| 1,292,964 | Ruddell | Jan. 28, 1919 |
| 1,570,138 | Got | Jan. 19, 1926 |
| 1,594,829 | Gray et al. | Aug. 3, 1926 |
| 1,634,002 | Tom | June 28, 1927 |
| 2,258,218 | Rochow | Oct. 7, 1941 |
| 2,384,023 | Galstaun | Sept. 4, 1945 |
| 2,424,224 | Costello | July 22, 1947 |

FOREIGN PATENTS

| | | |
|---|---|---|
| 484,184 | France | Jan. 8, 1916 |

OTHER REFERENCES

"Silicon," Collings, Official Digest, Fed. of Paint and Varnish Clubs, September 1949, pages 626–633.